United States Patent [19]

Aoki et al.

[11] Patent Number: 4,941,372
[45] Date of Patent: Jul. 17, 1990

[54] APPARATUS FOR SHIFT CONTROL IN AN AUTOMATIC TRANSMISSION

[75] Inventors: Takashi Aoki, Saitama; Satoshi Terayama, Tokyo; Junichi Miyake, Saitama, all of Japan

[73] Assignee: Honda Giken Kogyo Kabushiki Kaisha, Tokyo, Japan

[21] Appl. No.: 309,437

[22] Filed: Feb. 10, 1989

[30] Foreign Application Priority Data

Feb. 10, 1988 [JP] Japan .................. 63-029608

[51] Int. Cl.⁵ ............................................. B60K 41/00
[52] U.S. Cl. .......................................... 74/878; 74/335
[58] Field of Search ........................ 74/335, 866, 878

[56] References Cited

U.S. PATENT DOCUMENTS

| | | | |
|---|---|---|---|
| 4,406,181 | 9/1983 | Kubo et al. | 74/878 X |
| 4,555,959 | 12/1985 | Braun | 74/335 X |
| 4,574,661 | 3/1986 | Opperud et al. | 74/878 X |
| 4,660,430 | 4/1987 | Bortfeld et al. | 74/335 |
| 4,693,142 | 9/1987 | Kurihara et al. | 74/866 X |
| 4,762,262 | 2/1988 | Hayakawa et al. | 74/866 |
| 4,788,892 | 12/1988 | Komoda et al. | 74/878 X |
| 4,815,341 | 3/1989 | Ohkubo et al. | 74/878 |

FOREIGN PATENT DOCUMENTS

| | | | |
|---|---|---|---|
| 46845 | 3/1982 | European Pat. Off. | 74/878 |
| 48-209 | 6/1973 | Japan . | |
| 47-36284 | 12/1982 | Japan . | |
| 61-189354 | 8/1986 | Japan . | |

Primary Examiner—Dwight Diehl
Attorney, Agent, or Firm—Lyon & Lyon

[57] ABSTRACT

An apparatus for controlling gear shifting in an automatic transmission on a motor vehicle has maximum speed range cut-off switch which can manually be turned on and off selectively, the arrangement being such that the setting of a maximum speed range in each of the shift ranges is prohibited by turning on the maximum speed range cut-off switch.

When the maximum-speed range cut-off switch is turned off, speed range shifting is automatically performed dependent on the traveling states of the motor vehicle in one of the shift ranges which is selected by the shift lever shifted to a corresponding shift position. When the maximum speed range cut-off switch is turned on, the setting of the maximum speed range is prohibited in each of the shift ranges. In each shift range, speed range shifting is carried out automatically between the lowest-speed range and a speed range which is one range lower than the maximum speed range dependent on the traveling states of the motor vehicle.

6 Claims, 5 Drawing Sheets

APPARATUS FOR SHIFT CONTROL IN AN AUTOMATIC TRANSMISSION

BACKGROUND OF THE INVENTION

The present invention relates to an apparatus for controlling a vehicular automatic transmission to shift gears automatically dependent on the power output of the engine on a motor vehicle and the speed of travel of the motor vehicle.

Automatic transmissions are arranged to shift gears (speed ranges) automatically dependent on running conditions of a motor vehicle (such for example as the load on the engine on the motor vehicle, the speed of travel of the motor vehicle, and other parameters) to achieve desired vehicle running characteristics. It is customary to provide a shift map composed of upshifting and downshifting lines for each speed range, the lines being established in relation to the vehicle speed, the opening of a throttle valve, the intake vacuum, etc. which represent the engine power output, and to control the automatic transmission to shift the speed ranges according to the shift map dependent on the changes of traveling states as indicated on the shift map. One example of such shifting control is disclosed in Japanese Laid-Open Patent Publication No. 61-189354, for example.

A shift map is established in order to meet various road conditions such as those of a normal road, an expressway, a mountainous road, and other roads, and hence many factors or considerations are involved in making such a shift map. There are also different demands for shift patterns dependent on whether the driver of an automobile wants to drive the automobile comfortably or in a sporty manner.

It has heretofore been proposed to change a shift map with a selector switch for selecting a normal shift pattern (normal mode) or a sporty shift pattern (power mode) according to the will of the driver, or to switch to a power mode dependent on the degree of the steering operation, the rate at which an accelerator pedal depressed, and the change in the speed ratio of a torque converter (see for example Japanese Patent Publications Nos. 47-36284 and 48-209 and Japanese Laid-Open Patent Publication No. 61-189354).

Each of the selectable shift patterns as described above is however a comprise between various driving needs. Even if normal and power modes, for example, are selectively available, each of these modes is usually established so as to suit the average driver's demand for a shift pattern for such a mode. It has been quite difficult to obtain a shift pattern which would meet the driving needs of all automobile drivers.

SUMMARY OF THE INVENTION

In view of the aforesaid problems, it is an object of the present invention to provide a shift control apparatus which will be operated according to the will of a driver to change a shaft pattern in a simple and clear-cut manner dependent on the need of the driver.

To achieve the above object, an apparatus for controlling gear shifting in an automatic transmission on a motor vehicle has maximum speed range cut-off switch which can manually be turned on and off selectively, the arrangement being such that the setting of a maximum speed range in each of the shift ranges is prohibited by turning on the maximum speed range cut-off switch.

When the maximum-speed range cut-off switch is turned off, speed range shifting is automatically performed dependent on the traveling states of the motor vehicle in one of the shift ranges which is selected by the shift lever shifted to a corresponding shift position. When the maximum speed range cut-off switch is turned on, the setting of the maximum speed range is prohibited in each of the shift ranges. In each shift range, speed range shifting is curried out automatically between the lowest-speed range and a speed range which is one range lower than the maximum speed range dependent on the traveling states of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

A preferred embodiment of the present invention will hereinafter be described with reference to the accompanying drawings.

Figure 1:
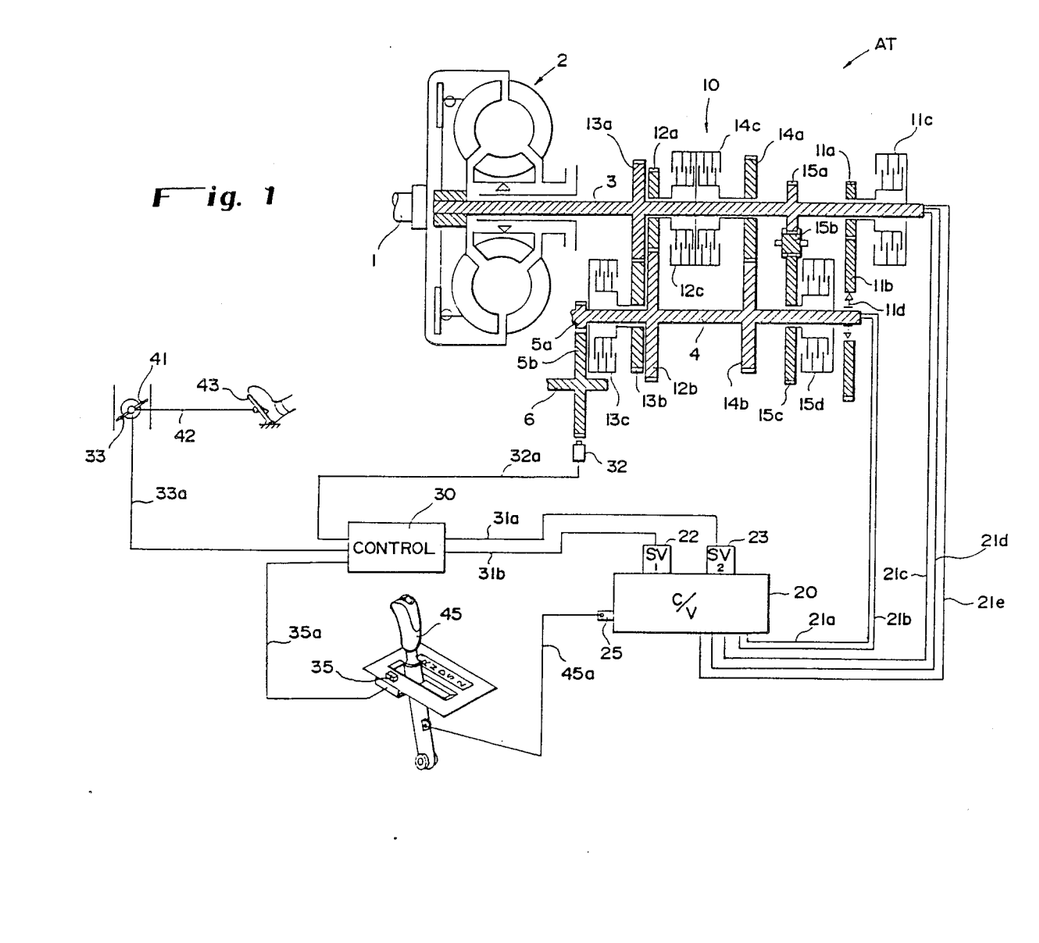
FIG. 1 is a schematic view of an automatic transmission incorporating a control apparatus according to the present invention.

FIG. 1 schematically shows an automatic transmission which is mounted on a motor vehicle and controlled by an apparatus of the present invention. The automatic transmission, generally denoted at AT, has a transmission mechanism 10 comprising a plurality of gear trains for changing the speed of rotation of the engine output transmitted through a torque converter 2 and for applying the engine power output to an output shaft 6. More specifically, the engine power from the torque converter 2 is applied to an input shaft 3, and then transmitted, while its rotational speed is being changed, to a countershaft 4 extending parallel to the input shaft 3 through a selected one of five gear trains disposed between the input shaft 3 and the countershaft 4. The engine power is then applied from the countershaft 4 to an output shaft 6 through output gears 5a, 5b disposed between the countershaft 4 and the output shaft 6.

The five gear trains between the input shaft and the countershaft 4 include a first speed range gear train composed of gears 11a, 11b for a first gear position, a second speed range gear train composed of gears 12a, 12b for a second gear position, a third speed range gear train composed of gears 13a, 13b for a third gear position, a fourth speed range gear train composed of gears 14a, 14b for a fourth gear position, and a reverse speed range gear train composed of gears 15a, 15b, 15c for a reverse gear position. These gear trains are associated respectively with hydraulically operated clutches 11c, 12c, 13c, 14c, 15d for enabling the gear trains to transmit the engine power output from the input shaft 3 to the counter shaft 4. A one-way clutch 11d is disposed in the first range gear 11b. By selectively operating the hydraulically operated clutches, one of the five gear trains is selected for engine power transmission while changing the rotational speed of the engine output.

The five hydraulically operated clutches 11c through 15d are controlled in operation by the pressurized hydraulic fluid supplied and discharged through hydraulic pressure lines 21a through 21e from and to a hydraulic pressure control valve 20.

The hydraulic pressure control valve 20 is operated by a manual spool valve 25 coupled by a wire 45a to a shift lever 45 movable by the driver, and two solenoid valves 22, 23.

The solenoid valves 22, 23 are selectively actuated and inactivated by operating signals supplied from a controller 30 through signal lines 31a, 31b. The controller 30 is supplied with a vehicle speed signal fed via a signal line 32a from a vehicle speed sensor 32 which detects the vehicle speed based on rotation of the output gear 5b, a throttle valve opening signal fed via a signal line 33a from a throttle valve opening sensor 33 which detects the opening of an engine throttle valve 41, and a cut-off signal fed via a signal line 35a from a maximum-speed range cut-off switch 35 which can manually be turned on and off. The throttle valve 41 is coupled to a throttle or accelerator pedal 43 through a wire 42. Therefore, the depth to which the throttle pedal 43 is depressed can be detected by detecting the throttle valve opening.

The hydraulic pressure control valve 20 will be described below with reference to FIG. 2.

In the control valve 20, the operating oil supplied from an oil sump 7 by a pump 8 is delivered to a regulator valve 50 via a line 101, and the pressure of the delivered operating oil is regulated into a predetermined line pressure by the regulator valve 50. The fluid having the line pressure is supplied via a line 110 to the manual spool valve 25 which then selectively supplies the fluid having the line pressure to the hydraulic clutches 11c, 12c, 13c, 14c, 15d to control these clutches, dependent on operation of the manual spool valve 25 and various other valves in the control valve 20 according to traveling states of the motor vehicle.

The various valves in the control valve assembly 20 will be described below. The control valve 20 includes a check valve 52 disposed downstream of the regulator valve 50 for preventing the oil of lubricating supplied to various parts of the automatic transmission AT from rising beyond a predetermined pressure level. A modulator valve 54 reduces the line pressure fed from a line 103 to produce a prescribed modulator pressure. The modulator valve 54 then supplies working oil under the modulator pressure via a line 104 to a lock-up clutch control circuit (not shown) of the torque converter 2 and also via a line 105 to the first and second solenoid valves 22, 23 for controlling operation of shift valves.

The manual valve 25 is operated in interlinked relation to a shift lever 45 that is manually moved by the driver. The manual valve 25 is selectively positioned in any one of six positions P, R, N, D, S, 2 for selectively supplying the line pressure from the line 110 to line 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valves 22, 23 are turned on the off, for controlling the supply of the line pressure to and the discharge of the line pressure from the clutches 11c, 12c, 13c, 14c for the first through fourth gear positions, respectively.

The lines 106a, 106b are connected to the firt solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second valve 23 is de-energized, the drain port thereof is closed to allow the working oil under the modulator pressure to be supplied from the line 105 to the lines 106c through 106f. When the solenoid of the second solenoid valve 23 is energized, the drain port thereof is opened to reduce the pressure in the line 106c through 106f substantially to zero.

The line 106a is connected to the righthand end (as shown) of the 1-2 shift valve 60, the line 106b is connected to the righthand end of the 2-3 shift valve 62, the line 106c is connected to the lefthand end of the 1-2 shift valve 60, the line 106e is connected to the righthand end of the 3-4 shift valve 64, and the line 106f is connected to the lefthand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-3, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired speed range.

A linear solenoid valve 56 has a linear solenoid 56a. A current supplied to the linear solenoid 56a is controlled to control the operating force of the linear solenoid valve 56 for controlling the magnitude of a hydraulic pressure to be supplied to a line 120. Normally, the current supplied to the linear solenoid 56a is controlled so that hydraulic pressure (throttle pressure) corresponding to the opening of the throttle valve will be developed in the line 120.

A clutch pressure control valve 78 is disposed in a line extending from the manual valve 25 to the 1-2 shift valve 60 and is operable in response to the throttle pressure which is regulated by the linear solenoid valve 56. The line pressure supplied to the clutches 11c, 12c, 13c, 14c through the shift valves 60, 62, 64 is controlled dependent on the throttle pressure, i.e., the engine power, by the clutch pressure control valve 78. The torque capacity required when operating the hydraulically operated clutches can thus be held to a minimum required which corresponds to the engine power output.

The control valve assembly 20 also has first second, third, and fourth orifice control valves 70, 72, 74, 76 for releasing hydraulic pressure from the hydraulic pressure chamber in the clutch assocated with a previous speed range in timed relation to the development of a pressure buildup in the hydraulic pressure chamber in the clutch associated with a next speed range, when a speed range shift is effected. More specifically, the first orifice control valve 70 controls the timing of releasing the hydraulic pressure from the third-speed-range clutch when a downshift is effected from the third speed range to the second speed range. The second orifice control valve 72 controls the timing of releasing the hydraulic pressure from the second-speed-range clutch when an upshift is carried out from the second speed range to the third speed range or from the second speed range to the fourth speed range. The third orifice control valve 74 controls the timing of releasing the hydraulic pressure from the fourth-speed-range clutch upon a downshift from the fourth speed range to the third speed range or from the fourth speed range to the second speed range. The fourth orifice control valve 76 controls the timing of releasing the hydraulic pressure from the third-speed-range clutch at the time of an upshift from the third speed range to the fourth speed range.

Figure 2:
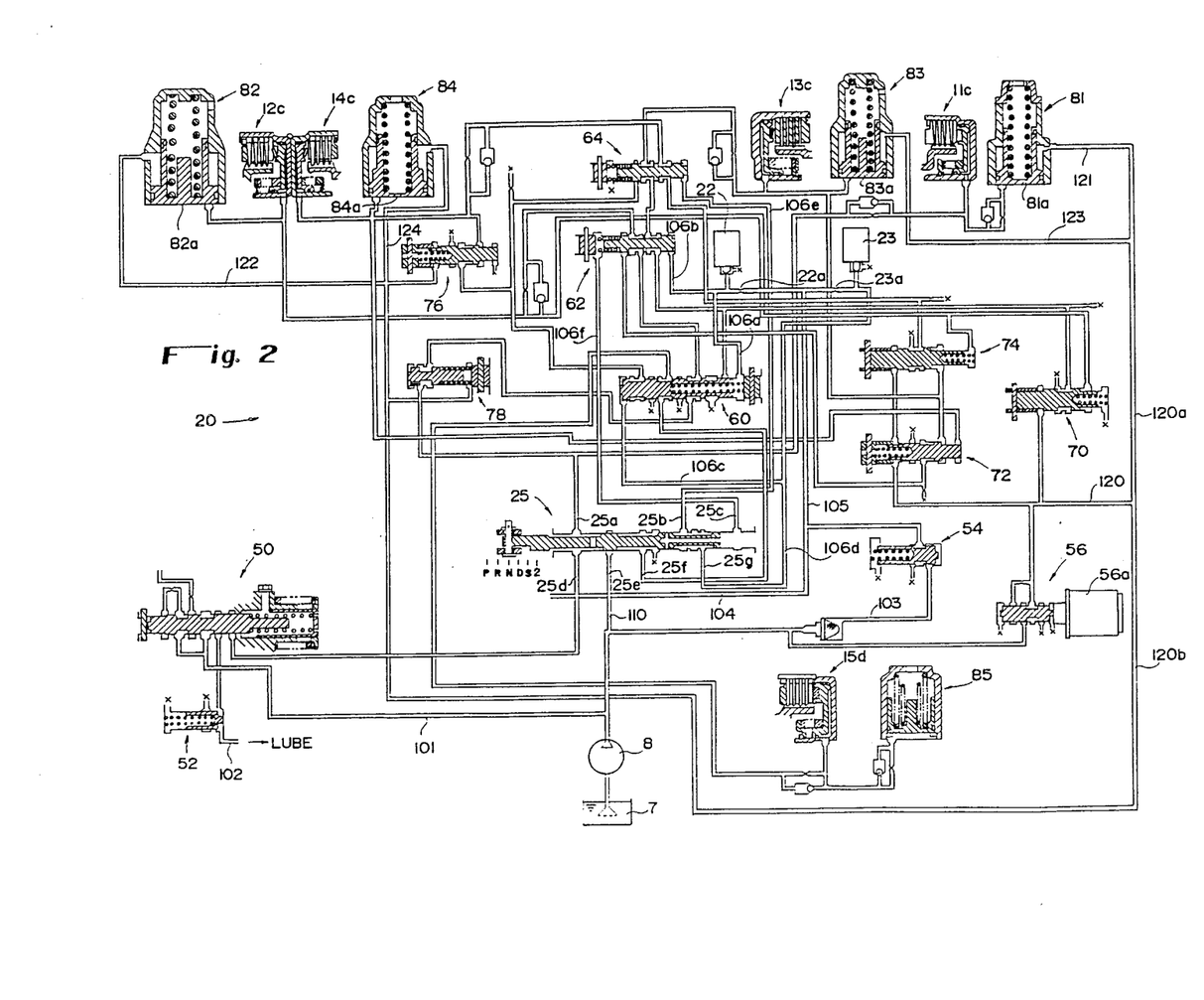
FIG. 2 is a circuit diagram of a hydraulic circuit including a hydraulic control valve for use with the automatic transmission.

As shown in FIG. 2, the throttle pressure as regulated by the linear solenoid valve 56 is applied to the first through fourth orifice control valves 70, 72, 74, 76, so that the timing of a speed range shift controlled by these orifice control valves will vary dependent on the opening of the throttle valve. Stated otherwise, the timing of speed range shift is controlled so as to be optimum according to the engine power output.

The control valve assembly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also have back pressure chambers opposite to the respective pressure bearing chambers with pistons 81a, 82a, 83a, 84a therebetween, the back pressure chamber being connected to respective lines 121, 122, 123, 124 which are coupled to the linear solenoid valve 56 via lines 120a, 120a and the line 120.

By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch (next-speed-range clutch) when a speed range shift is effected.

In the hydraulic pressure control valve assembly 20 thus constructed, the manual valve 25 is operated by the shift lever 45 and the solenoid valves 22, 23, are turned on and off to selectively supply the line pressure to the hydraulically operated clutches 11c, 12c, 13c, 14c and automatically selecting a speed range position.

Operation to control speed range shifting in the automatic transmission of the above construction will be described below.

Speed range shift control is performed dependent on a shift range selected by the manual valve 25 of the hydraulic pressure control valve assembly 20 in response to manual operation of the shift lever 45. Available shift ranges include shift ranges or positions P, R, N, D, S, 2 for example. In the ranges P and N, all the clutches 11c through 15d are disengaged and the transmission is in a neutral position. In the range R, the reverse-speed-range clutch 15d is engaged to select the reverse range. In the shift ranges D, S, and 2, speed ranges are selected based on a shift map.

Speed range shifting control based on such a shift map will be described with respect to the shift ranges D and S by way of example.

It is first assumed that the maximum speed range cut-off switch 35 is turned off.

Figure 3A:
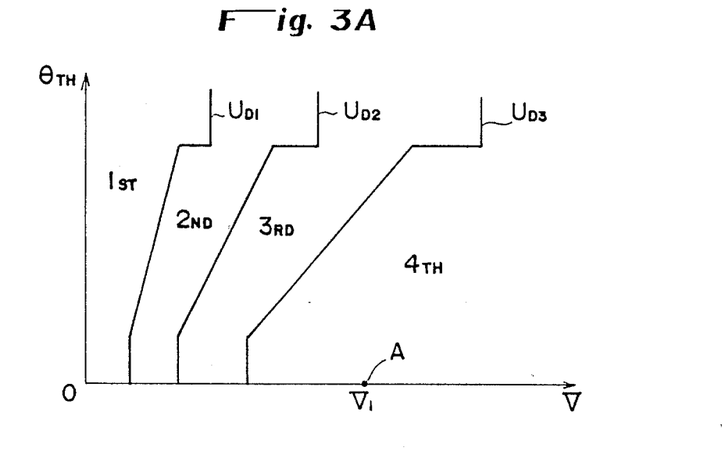
FIGS. 3A, 3B, 5A, and 5B are graphs showing shift maps for effecting speed range shifting in the automatic transmission.

As shown in FIG. 3A, a shift map available for the range D with the switch 35 turned off is composed of an upshifting line $U_{D1}$ between the first and second speed ranges, an upshifting line $U_{D2}$ between the second and third shift ranges, and an upshifting line $U_{D3}$ between the third and fourth shift ranges, these lines being established based on the vehicle speed V and the throttle valve opening $\theta_{TH}$. Although not shown for brevity, the shift map also has downshifting lines plotted on lower vehicle speed sides of the upshifting lines $U_{D1}$, $U_{D2}$, $U_{D3}$ with certain hysteresis.

When the shift lever 45 is shifted into the position D to select the shift range D, the controller 30 determines the traveling state of the vehicle as a point on the shift map based on a vehicle speed signal supplied via the signal line 32a and a throttle valve opening signal supplied via the signal line 33a. The controller 30 tracks down the point which is moved on the shift map as the motor vehicle runs. When the point moves across an upshifting line, the controller 30 applies operating signals to the solenoid valves 22, 23 via the signal lines 31a, 31b to effect a upshift across that upshifting line. The solenoid valves 22, 23 are operated to enable the hydraulic pressure control valve 20 to supply hydraulic pressure to and discharge hydraulic pressure from the hydraulically operated clutches 11c through 15d, thereby performing an upshift.

A downshift is carried out at the time the point on the shift map moves across a downshifting line (not shown) as when the vehicle speed is lowered.

Figure 3B:
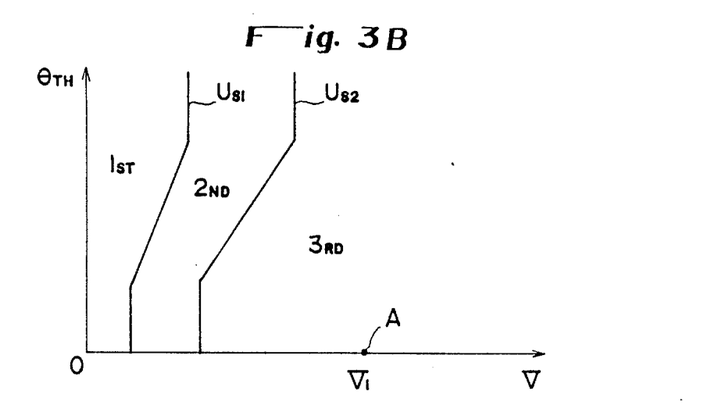

When the shift lever 45 is shifted into the position S to select the shift range S, the controller 30 selects a shift map as shown in FIG. 3B. The shift map of FIG. 3B includes an upshifting line $U_{S1}$ between the first and second speed ranges, and an upshifting line $U_{S2}$ between the second and third speed ranges, these lines being established based on the vehicle speed V and the throttle valve opening $\theta TH$. These upshifting lines are of different characteristics from those of the upshifting lines in the shift range D. Although not shown for brevity, the shift map also has downshifting lines plotted on lower vehicle sides of the upshifting lines $U_{S1}$, $U_{S2}$ with certain hysteresis.

The controller 30 determines the running conditions of the vehicle as a point on the shift map based on a vehicle speed signal supplied via the signal line 32a and a throttle valve opening signal supplied via the signal line 33a. When the point traverses an upshifting line, the controller 30 controls the control valve assembly 20 to effect an upshift across that upshifting line.

If it is desired to close the throttle valve 41 almost fully to apply engine braking when the motor vehicle is running at a relatively high speed with the transmission in the shift range D as indicated at a point A in FIG. 3A, then the shift lever 45 is manually shifted into the shift positions S to shift down the transmission from the fourth speed range to the third speed range. When the driver wants to apply engine braking while running along a mountainous road or a winding road at a relatively high speed, the transmission may be shifted down from the fourth speed range to the third speed range by shifting the shift lever from the position D to the position S with the maximum speed range cut-off switch 35 remaining turned off. The driver can therefore adjust the intensity of engine braking in response to the driver's own control over the shift lever 45 as if he were operating manual transmission. The present speed range can be known simply by looking at the position of the shift lever 45.

Figure 4:
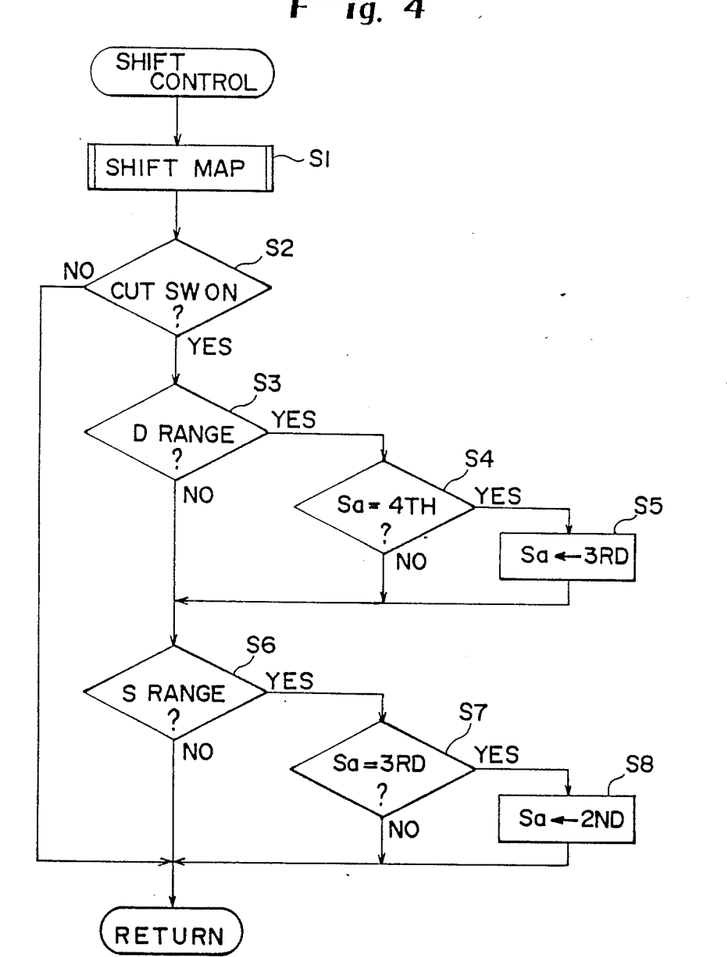
FIG. 4 is a flowchart of a control sequence to be executed by the control apparatus.

Speed range shifting control with the maximum speed range cut-off switch 35 will be described with reference to the flowchart of FIG. 4 and the shift maps of FIGS. 5A and 5B.

The speed range shifting control process is started by reading the shift maps shown in FIGS. 3A and 3B in a step S1. Then, a step S2 determines whether the maximum speed range cut-off switch 35 is turned on or off. If it is turned off, then the processing is over, and shifting control is carried out based on the read shift maps shown in FIGS. 3A and 3B in the manner described above.

If the maximum speed range cut-off switch 35 is turned on, then control goes to a step S3 to determine if the shift lever is in the range D or not. If it is in the range D, then a step S4 determines whether the present speed range is the fourth speed range, i.e., the maximum speed range, or not. If the present speed range is the maximum speed range, then the transmission is shifted down to the third speed range in a step S5. That is, speed range shiftig is effected as if no upshifting line $U_{D3}$ were present on the shift map as shown in FIG. 5A.

If the shift lever is not is the shift range D, then a step S6 determines if the shift lever is in the shift range S. If the shift lever is in the shift range S, than a step S7 determines whether the present speed range is the third speed range, i.e., the maximum speed range in the shift range S, or not. If the present speed range is the maximum speed range, then the transmission is shifted down to the second speed range in a step S8. That is, speed range shifting is effected as if no upshifting line $U_{S2}$ were present on the shift map as shown in FIG. 5B.

Figure 5A:
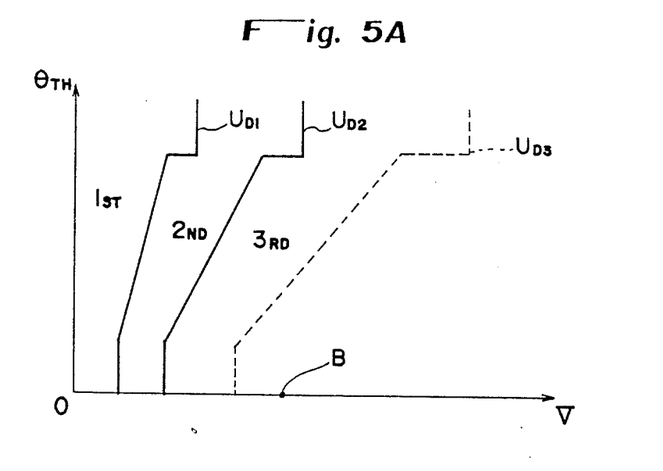
Figure 5B:
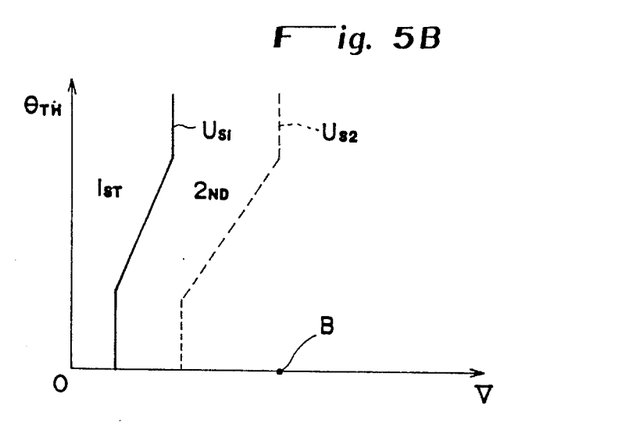

If it is desired to close the throttle valve 41 almost fully to apply engine braking when the motor vehicle is running at a relatively high speed with the transmission in the shift range D as indicated at a point B in FIG. 5A (at this time, the present speed range is the third speed range since the maximum speed range is cut off), then the shift lever 45 is manually shifted into the shift position S to shift down the transmission from the third speed range to the second speed range. When the motor vehicle is to run around a tight corner, the transmission may be shifted down from the third speed range to the second speed range by shifting the shift lever from the shift position D to the shift position S with the maximum speed range cut-off switch 35 remaining turned on. The driver can therefore shift down the transmission in response to the driver's own control over the shift lever 45 as if he were operating a manual transmission. The driver can recognize the present speed range simply by looking at the position of the shift lever 45.

While the speed range shifting in the shift ranges D and S has been described above, the above description is substantially applicable to speed range shifting in the shift range 2. In the shift range 2, a shift map is provided which allows automatic gear shifting between the first and second speed ranges, and the present speed range is fixed to the first speed range by turning on the maximum speed range cut-off by turning on the maximum speed range cut-off switch. In the aforesaid description, the same speed ranges in the shift maps in the shift ranges D and S are differently established. However, a shift map for the shift range S may be produced simply by removing the shifting lines associated with the fourth shift range from the shift map for the shift range D. Although the illustrated arrangement is concerned with the control of speed range shifting between the four speed ranges except the reverse range, the principles of the present invention are also applicable to speed range shifting control for an automatic transmission having five speed ranges except a reverse range.

With the present invention, as described above, there is provided a maximum speed range cut-off switch for prohibiting the setting of a maximum speed range in each shift ranges. When running around a sharp corner, the maximum speed range cut-off switch is turned on. Then, in the range D, the motor vehicle runs with the transmission in a speed range which is one range lower than the maximum speed range. By shifting the shift lever from the shift range D to the shift range S, the transmission is further shifted down to a next lower speed range. Since speed range shifting can be effected by shifting the shift lever according to the driver's own will, the driver can drive the vehicle in a manner to suit a the driver's driving taste at the time as if the driver were operating a manual transmission. Inasmuch as shifting in the transmission is controlled dependent on operation of the shift lever, the present speed range can be ascertained simply by seeing the position of the shift lever.

The invention being thus described, it will be obvious that the same may be varied in may ways. Such variations are not to be regarded as a departure from the spirit and scope of the invention, and all such modifications as would be obvious to one skilled in the art are intended to be included within the scope of the followig claims.

What is claimed is:

1. An apparatus for shift control in an automatic transmission on a motor vehicle, said automatic transmission having a transmission mechanism including first, second, third and fourth speed ranges and a manually operable shift lever movable selectively into a plurality of different shift range positions, so that the speed ranges will automatically be shifted in a selected one of the shift ranges dependent on running conditions of the motor vehicle, comprising:

a maximum speed range cut-off switch which is manually turned on and off selectively, the arrangement being such that the setting of a maximum speed range in each of the shift ranges is prohibited by turning on said maximum speed range cut-off switch, and the setting of the fourth speed range is prohibited when said maximum speed range cut-off switch is being turned on, and wherein the shift ranges include a shift range D at which the automatic shift control is carried out within the 1st through the fourth speed ranges and a shift range S at which the automatic control is carried out within the 1st through the third speed ranges, the setting of the fourth speed range is prohibited by turning on said maximum speed range cut-off switch when said shift range D is selected, and the setting of the third speed range is prohibited by turning on said maximum speed range cut-off switch when said shift range S is selected.

2. An apparatus for shift control in an automatic transmission on a motor vehicle, said automatic transmission having a transmission mechanism including a plurality of speed ranges, comprising:
   a manually operable shift lever being movable selectively into a plurality of different shift ranges, so that a specified number of speed ranges are selected among said plurality of speed ranges for each shift range selected by said shift lever, said shift ranges including at least two normal driving shift ranges,
   a shift controller for automatic shifting within the selected speed ranges for said each shift range depending on running conditions of the vehicle, and
   a maximum speed range cut-off switch which prohibits the shifting to the maximum speed range within said selected speed ranges when said shift lever is positioned at one of said normal driving shift ranges and said cut-off switch is on.

3. An apparatus for shift control in an automatic transmission as defined in claim 2 wherein said maximum speed range cut-off switch comprises a manually operable switch.

4. An apparatus for shift control in an automatic transmission as defined in claim 2 wherein shifts by said shift controller are carried out based on a shift map having a plurality of upshifting lines and a plurality of downshifting lines, an upshifting being carried out when a point representing the traveling state of the vehicle on said shift map moves across said upshifting line toward high speed region, and a downshifting being carried out when said point moves across said downshifting line toward low speed region.

5. An apparatus for shift control in an automatic transmission as defined in claim 2 wherein said normal driving shift ranges include a shift range D at which the automatic shift control is carried out within a first through a fourth speed range and a shift range S at which the automatic control is carried out within a first through a third speed ranges, shifting to the fourth speed range being prohibited by turning on said maximum speed range cut-off switch when said shift lever is positioned at said shift range D, and shifting to the third speed range being prohibited by turning on said maximum speed range cut-off switch when said shift lever is positioned at said shift range S.

6. An apparatus for shift control in an automatic transmission as defined in claim 5 wherein said upshifting lines and downshifting lines in shift range D are of different characteristics from those in shift range S.

* * * * *